(12) United States Patent
Trifonov et al.

(10) Patent No.: US 7,254,295 B2
(45) Date of Patent: Aug. 7, 2007

(54) OPTICAL FIBER INTERFEROMETER WITH RELAXED LOOP TOLERANCE AND QKD SYSTEM USING THE SAME

(75) Inventors: Alexei Trifonov, Boston, MA (US); A. Craig Beal, Watertown, MA (US)

(73) Assignee: MagiQ Technologies, Inc., New York, NY (US)

( * ) Notice: Subject to any disclaimer, the term of this patent is extended or adjusted under 35 U.S.C. 154(b) by 141 days.

(21) Appl. No.: 11/284,226

(22) Filed: Nov. 21, 2005

(65) Prior Publication Data

US 2007/0114751 A1 May 24, 2007

(51) Int. Cl.
*G02F 1/35* (2006.01)
*G02B 6/26* (2006.01)
*G02B 6/28* (2006.01)
*H04L 9/00* (2006.01)
*G01B 9/02* (2006.01)

(52) U.S. Cl. .................. 385/27; 385/1; 385/2; 385/3; 385/24; 385/39; 380/277; 356/450; 356/491

(58) Field of Classification Search ............ 385/1–3, 385/15, 24, 27, 39, 50; 380/277, 278; 356/450, 356/491
See application file for complete search history.

(56) References Cited

U.S. PATENT DOCUMENTS 6,529,601 B1 * 3/2003 Townsend ................. 380/256

* cited by examiner

*Primary Examiner*—Frank G. Font
*Assistant Examiner*—Michael P. Mooney
(74) *Attorney, Agent, or Firm*—Opticus IP Law PLLC

(57) ABSTRACT

An optical fiber interferometer (10) with relaxed loop tolerance, and a quantum key distribution (QKD) system (200) using same is disclosed. The interferometer includes two optical fiber loops (LP1 and LP2). The loops have an optical path length (OPL) difference between them. A polarization-maintaining (PM) optical fiber section (60) of length ($L_{60}$) and having fast and slow optical axes ($A_F$ and $A_S$) optically couples the two loops. The length and fast-slow axis orientation is selected to introduce a time delay ($\Delta T_{1-2}$) between orthogonally polarized optical pulses traveling therethrough that compensates for the OPL difference. This allows for drastically relaxed tolerances when making the loops, leading to easier and more cost-effective manufacturing of the interferometer as well as related devices such as a optical-fiber-based QKD system.

12 Claims, 2 Drawing Sheets

OPTICAL FIBER INTERFEROMETER WITH RELAXED LOOP TOLERANCE AND QKD SYSTEM USING THE SAME

FIELD OF THE INVENTION

The present invention relates to interferometry, and in particular to optical-fiber-based interferometers and quantum key distribution (QKD) systems using same.

BACKGROUND OF THE INVENTION

An optical interferometer is a device that splits and later recombines coherent optical signals to make a measurement based on information (e.g., phase information) encoded in one or both of the optical signals. Optical interferometers are employed in a number of measurement-related applications, such as making precise measurements of surface topography, measuring precise distances between two objects, or measuring small amounts of motion.

There are a number of high-precision devices based on optical interferometers. One such device is the ring laser gyroscope used in navigation systems for airplanes and missiles. Another such device of is quantum key distribution (QKD) system used in quantum cryptography. This latter device is discussed in detail below and is used as an example application for the present invention.

Quantum Key Distribution (QKD)

QKD involves establishing a key between a sender ("Alice") and a receiver ("Bob") by using either single-photons or weak (e.g., 0.1 photon on average) optical signals (pulses) or "qubits" transmitted over a "quantum channel." The security of the key distribution is based on the quantum mechanical principle that any measurement of a quantum system in an unknown state will modify-its state. As a consequence, an eavesdropper ("Eve") that attempts to intercept or otherwise measure the exchanged qubits will introduce errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33.

The above-mentioned references by Bennett each describe a so-called "one-way" QKD system based on an extended interferometer having two loops—one at Alice and one at Bob. The loops are used to split and recombine the optical signals. One of the arms in each loop includes a phase modulator so that Alice and Bob can each impart a randomly selected phase to an optical signal traveling therethrough. The modulated optical signals are recombined (interfered) at Bob and measured using single-photon detectors arranged to indicate the overall modulation imparted to the interfered signal. Once a sufficiently large number of optical signals are exchanged, Alice and Bob share their modulation information and establish a secret key between them using known QKD techniques.

In order for the QKD system to function properly, each interferometer loop needs to be formed with great precision so that they have the same optical path length. This ensures that optical signals traveling over different paths of the interferometer meet at the same time and place and interfere. Given that the optical signals travel at nearly the speed of light in an optical fiber, even very small differences in the optical path taken by the two optical signals can lead to the optical signals missing each other and not interfering. The typical laser coherence length used in QKD systems is normally on the order of 10 ps (1 ps=200 mkm, assuming an optical fiber refractive index of 1.5). To assure good visibility (interference), the optical fiber sections that make up the arms of each optical fiber loop must be fabricated to an accuracy of the order of 1 ps (~200 mkm or 0.2 mm) or better. This is very difficult to do in practice, adds significantly to the overall manufacturing cost of the interferometer, and represents a source of manufacturing errors.

SUMMARY OF THE INVENTION

An aspect of the invention is an optical fiber interferometer that has first and second optical fiber loops, wherein the optical fiber loops have an optical path length (OPL) difference between them. The interferometer also includes a polarization-maintaining (PM) optical fiber section having fast and slow optical axes ($A_F$ and $A_S$) and a length ($L_{60}$) that optically couples the first and second optical fiber loops. This PM optical fiber section carries orthogonally polarized optical signals formed by the first optical fiber loop. The orthogonally polarized optical signals travel at different speed down the fiber due to the fast and slow optical axes and thus undergo a relative time delay. The length $L_{60}$ and orientation of the fast and slow optical axes are selected so that the PM optical fiber section imparts a time delay between the orthogonally polarized optical signals that compensates for the OPL difference between the two optical fiber loops.

Another aspect of the invention is a quantum key distribution (QKD) system that employs the above-described optical fiber interferometer. The QKD system includes first and second phase modulators respectively arranged in the first and second optical fiber loops. The modulators are adapted to selectively randomly phase modulate respective first and second optical signal passing therethrough. The system also includes first and second single-photon detectors (SPDs) arranged relative to the second optical fiber loop. One of the SPDs detects the interfered optical signal formed by the second optical fiber loop from the first and second modulated optical signals. The overall phase imparted to the modulated signals determines which SPD detects the interfered optical signal.

Another aspect of the invention is a method of forming an optical fiber interferometer. The method includes providing first and second optical fiber loops having an OPL difference between them. The method also includes optically coupling the optical fiber loops with a polarization-maintaining (PM) optical fiber section having a length and fast-slow axis orientation selected to impart a time-delay to orthogonally polarized optical signals traveling therethrough that compensates for the OPL difference.

Figure 1:
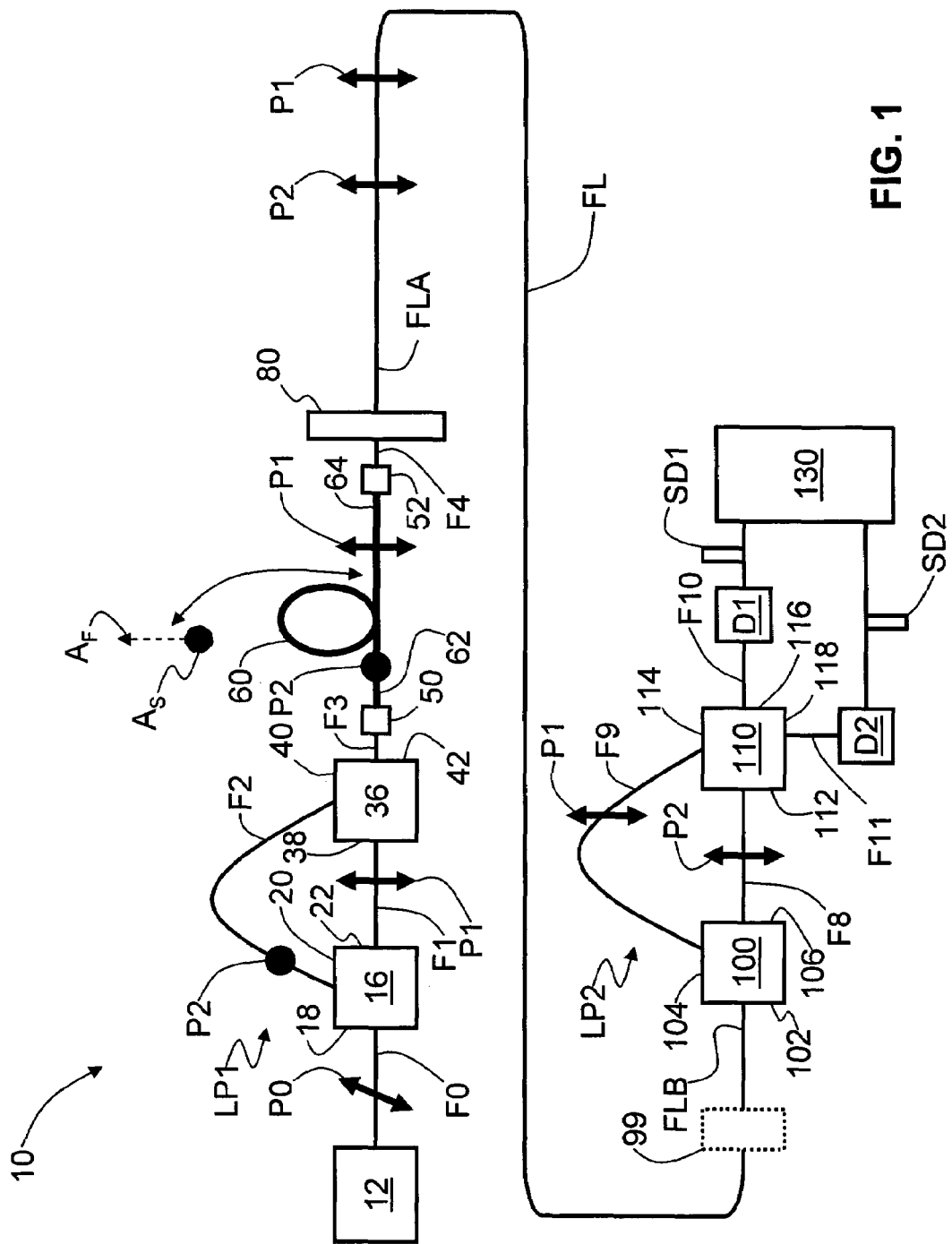
FIG. 1 is a schematic diagram of an example embodiment of an optical fiber interferometer according to the present invention.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

In the Figures, like elements are identified by like reference numbers when convenient. Also, the polarization directions shown in the Figures and discussed below are selected for the sake of illustration, and one skilled in the art will recognize that other polarization directions are possible.

DETAILED DESCRIPTION OF THE INVENTION

Apparatus

FIG. 1 is a schematic diagram of an example embodiment of an optical fiber interferometer 10 according to the present invention. Interferometer 10 includes a coherent light source 12, such as a laser. Interferometer 10 also include a beam splitting element 16 (e.g., a beam splitter cube) optically coupled to light source 12. In an example embodiment, beam splitting element 16 is adapted to receive light of one polarization and divide it into two orthogonal polarizations. Beam splitting element has an input port 18, and output ports 20 and 22. Beam splitting element 16 is optically coupled to light source 12 at input port 18 via a polarization maintaining (PM) optical fiber section F0.

Interferometer 10 also includes a polarizing beam splitting element 36 (e.g., a beam splitter cube) having input ports 38 and 40 and an output port 42. Beam splitting element 36 is optically coupled to beam splitting element 16 by an optical fiber section F1 connecting output port 22 of element 16 to input port 38 of element 36. Likewise, beam splitting element 36 is optically coupled to beam splitting element 16 by an optical fiber section F2 connecting output port 20 of element 16 to input port 40 of element 36. Optical fiber sections F1 and F2 along with beam splitting elements 16 and 36 constitute a first interferometer "loop" LP1, wherein the optical fiber sections are the "arms" of the loop. The formation of loop LP1 is discussed in greater detail below.

In an example embodiment, beam splitting element 16 is a 50-50 beam splitting element and optical fiber section F1 is made from PM-maintaining optical fiber that is twisted so that the polarization of light in the optical fiber section is effective rotated by 90° by the time it reaches input port 40 of beam splitting element 36.

Interferometer 10 also includes a first optical fiber coupler 50 arranged adjacent output port 42 of beam splitting element 36, and is optically coupled thereto by a PM optical fiber section F3. The use of optical fiber coupler 50 and PM optical fiber section F3 is optional and represents a way to facilitate the assembly of the interferometer. A section 60 of polarization-maintaining (PM) optical fiber having a length $L_{60}$, an input end 62, and an output end 64, is optically coupled to first optical fiber coupler 50 at its input end 62. PM optical fiber output end 64 is optically coupled to a second optical fiber coupler 52, which is also optically coupled to a PM optical fiber section F4.

PM optical fiber section 60 has orthogonal fast and slow optical axes $A_F$ and $A_S$, and a length $L_{60}$. Length L60 and the orientation of the fast-slow axes $A_F$ and $A_S$ are selected to compensate for optical path length differences between interferometer loops LP1 and LP2, as discussed in greater detail below. The use of second optical fiber coupler 52 and PM optical fiber section F4 eases manufacturing and is thus optional.

Interferometer 10 further includes a polarization-adjusting member 80 optically coupled to optical fiber coupler 52 via PM optical fiber section F4. Polarization-adjusting member 80 is adapted to receive orthogonally polarized optical signals and output two co-polarized optical signals. In an example embodiment, polarization-adjusting member 80 includes a polarizer arranged with its principal axis at 45° relative to fast axis $A_F$ of PM optical fiber section 60. In another example embodiment, polarization-adjusting member 80 includes a half-wave plate and polarizer with its principal axis at 0° relative to fast axis $A_F$ of PM optical fiber section 60. In another example embodiment, polarization-adjusting member 80 includes a high-speed phase modulator gated to act on the vertically polarized optical signal P1 to transform this optical signal into a horizontally polarized optical signal.

With continuing reference to FIG. 1, in an example embodiment interferometer 10 includes an optical fiber section FL that at one end (FLA) is optically coupled to polarization-adjusting member 80 and at its opposite end (FLB) is optically coupled to an input port 102 of a 50-50 beam splitting element 100 that also includes two output ports 104 and 106. It is worth noting here that in an alternative example embodiment, beam splitting element 100 is optically coupled directly to polarization-adjusting member 80 without the use of an optical fiber section in between. However, optical fiber section FL allows for these two elements to be spaced apart, which is preferred for many applications, such as in the QKD system described below.

In an example embodiment, beam splitting element 100 is polarization maintaining, and interferometer 10 additionally includes a polarization controller 99 (dotted box) upstream of this element.

Interferometer 10 also includes a beam splitting element 110 having two input ports 112 and 114 and two output ports 116 and 118. Beam splitting element is optically coupled to beam splitting element 100 by an optical fiber section F8 connecting output port 106 of element 100 to input port 112 of element 110, and by an optical fiber section F9 connecting output port 104 of element 100 to input port 114 of element 110. Optical fiber sections F8 and F9 along with beam splitting elements 100 and 110 constitute a second optical fiber interferometer loop LP2, wherein the optical fiber sections are the arms of the loop. The formation of loop LP1 is discussed in greater detail below.

Interferometer 10 further includes two photodetectors D1 and D2 respectively optically coupled to output ports 116 and 118 of beam splitting element 110 via respective optical fiber sections F10 and F11. In an example embodiment, photodetectors D1 and D2 are single-photon detectors (SPDs). Photodetectors D1 and D2 are electrically coupled to detector electronic unit 130 (e.g., a computer) adapted to receive detector electrical signals SD1 and SD2, and process and store the corresponding information.

Loop Optical Path Difference

As discussed above, in a conventional optical fiber interferometer, optical fiber sections (arms) F1 and F2 of loop LP1 and optical fiber sections (arms) F8 and F9 of loop LP2 need to be cut with sub-millimeter accuracy, and typically to about 0.1 mm. This is a daunting task, which ends up adding cost to the manufacturing process, as well contributing to optical path length errors in the interferometer loops.

The optical fiber interferometer of the present invention allows for one or both of optical fiber loops LP1 and LP2 to be made with much less precision, e.g., on the order of a few millimeters (or even centimeters) rather than fractions of a millimeter. In an example embodiment, optical fiber loops LP1 and LP2 are made with relaxed tolerances (again, say to within a few millimeters or centimeters). Such relaxed tolerances generally lead to the optical path lengths of the loops being different. In an example embodiment of the present invention, the loops are intentionally made to have different optical path lengths, e.g., by intentionally foreshortening one of the loops relative to the other. In an example embodiment, the optical path length differences between loops LP1 and LP2 (whether intentional or unintentional) prevents full interference between the optical signals.

The optical path length (OPL) difference between loops LP1 and LP2 is defined as $\Delta L_{1-2}$. In an example embodiment of the invention, this OPL difference is measured (e.g., interferometrically). The OPL difference $\Delta L_{1-2}$ is then used to calculate a corresponding time delay $\Delta T_{1-2}$ caused by OPL difference $\Delta L_{1-2}$ via the relationship:

$$\Delta T_{1-2} = (n)(\Delta L_{1-2})/c \qquad \text{equation (1)}$$

where n is the index of refraction of the optical fiber sections (assumed to be the same in this example) and c is the speed of light.

The time delay due to the OPL difference is compensated by using a select length $L_{60}$ of PM optical fiber section 60. Because PM optical fiber section is birefringent, it has different refractive indices along axes $A_F$ and $A_S$), which gives rise to a group delay $D_{60}$ for orthogonally polarized optical signals oriented along the fast and slow axes. Because the difference in the refractive indices in the PM optical fiber section are relatively small, it takes a relatively long section of optical fiber to change the time delay between orthogonally polarized optical signals. The group delay $D_{60}$ is measured in ps/m, and a typical value is ~1 ps/m. This group delay allows for the time delay between orthogonally polarized optical signals traveling through PM optical fiber section 60 along the fast and slow axes to be adjusted with a high degree of precision. In particular, PM optical fiber section fast-slow axis orientation and length $L_{60}$ are selected to compensate for the mismatch in time delay between the orthogonal optical pulses caused by the OPL difference between the two loops. PM optical fiber section is oriented to select which optical signal is to be delayed, i.e., which optical signal is oriented to along fast axis of the PM optical fiber section and which is oriented along the slow axis.

The length $L_{60}$ that compensates for the OPL difference given by:

$$L_{60} = (\Delta T_{1-2})/D_{60} = (n)(\Delta L_{1-2})/(D_{60}c) \qquad \text{equation (2)}$$

From a practical manufacturing viewpoint, it is far easier to intentionally make the interferometer loops LP1 and LP2 have a different OPL (e.g., by intentionally foreshortening one of the loops) and then compensate for the difference by adjusting the length $L_{60}$ of PM optical fiber section 60, than it is to form all four optical fiber sections for loops LP1 and LP2 to within fractions of a millimeter. To illustrate this point, consider that for a group delay $D_{60}$ of 1ps/m, only one length $L_{60}$ of PM optical fiber 60 needs to be cut to a very forgiving precision of 1 meter, whereas forming loops L1 and L2 involves cutting each of four different optical fiber sections to a rather unforgiving precision of 0.1 mm. The present invention thus represents a manufacturing tolerance reduction of $10^4$ over the prior art.

Method of Operation

With continuing reference to FIG. 1, in the operation of optical fiber interferometer 10, light source 12 generates a 45°-polarized optical signal P0 that travels over optical fiber section F0 to PM beam splitting element 16. Beam splitting element 16 then divides optical signal P0 into a vertically polarized optical signal P1 that travels over optical fiber section F1 and a horizontally polarized optical signal P2 that travels over optical fiber section F2. Because optical fiber section F2 is longer than optical fiber section F1, there is a time delay, there is a time delay imparted to optical pulses P1 and P2, with optical pulse P1 leading optical pulse P2 in optical fiber section F3.

For the sake of discussion, it assumed that optical fiber section F2 in loop LP1 is shorter than optical fiber section F9 in loop LP2 so that there is an OPL difference $\Delta L_{1-2}$ between loops LP1 and LP2. Because optical fiber section F1 is shorter than optical fiber section F9, optical signals P1 and P2 have a time delay that is "too short" by an amount given by $\Delta T_{1-2}$ per equation (1), above.

Orthogonally polarized optical signals P1 and P2 travel through optical fiber section F3, through optical fiber coupler 50 and over PM optical fiber section 60. PM optical fiber 60 has a length $L_{60}$ as defined by equation (2), and is arranged (oriented) so that optical signal P1 travels along the fast axis $A_F$ while optical signal P2 travels along the slow axis $A_S$. This results in PM optical fiber section 60 imparting a time delay between optical signals P1 and P2 that makes up for the OPL difference between loops LP1 and LP2.

Properly delayed optical signals P1 and P2 leave PM optical fiber section 60 and pass through optical fiber coupler 52 and into optical fiber section F5, where the optical signals encounter polarization-adjusting member 80. Polarization adjusting member 80 operates on one or more of optical signals P1 and P2 so that these signals become co-polarized. For the sake of illustration, it is assumed that polarization-adjusting member 80 operates to make optical signals P1 and P2 vertically polarized, e.g., by rotating the polarization of optical signal P2 by 90°. Sending co-polarized optical signals from one interferometer loop to the other simplifies the interferometer because the two optical signals undergo the same phase perturbations as they travel between the loops.

Co-polarized optical signals P1 and P2 travel over optical fiber link FL to beam splitting element 100 and, in the aforementioned example embodiment, through polarization controller 99. In an example embodiment, beam splitting element 100 splits each optical signal P1 and P2 into two optical signals that each travel over optical fiber sections F8 and F9. For the sake of illustration, only the optical signals P1 and P2 that ultimately interfere are shown.

Because optical signals P1 and P2 now have the proper time delay between them, optical signal P1 traveling over the longer optical fiber section F9 is delayed by precise amount needed for it to interfere with optical signal P2 traveling over the shorter optical fiber section F8. This causes the two co-polarized optical signals P1 and P2 to be recombined (interfered) by beam splitting element 110. Depending on whether the interference is constructive or destructive, the interfered pulse is detected at either photodetector D1 or photodetector D2. Detection events at photodetectors D1 and D2 generate respective electrical detector signals SD1 or SD2 that are received and processed by detector electronic unit 130.

Example Application: QKD

The optical fiber interferometer of the present invention is useful for any application that would benefit from relaxing the tolerances on cutting the optical fiber sections that make up one or more of the interferometer loops.

Figure 2:
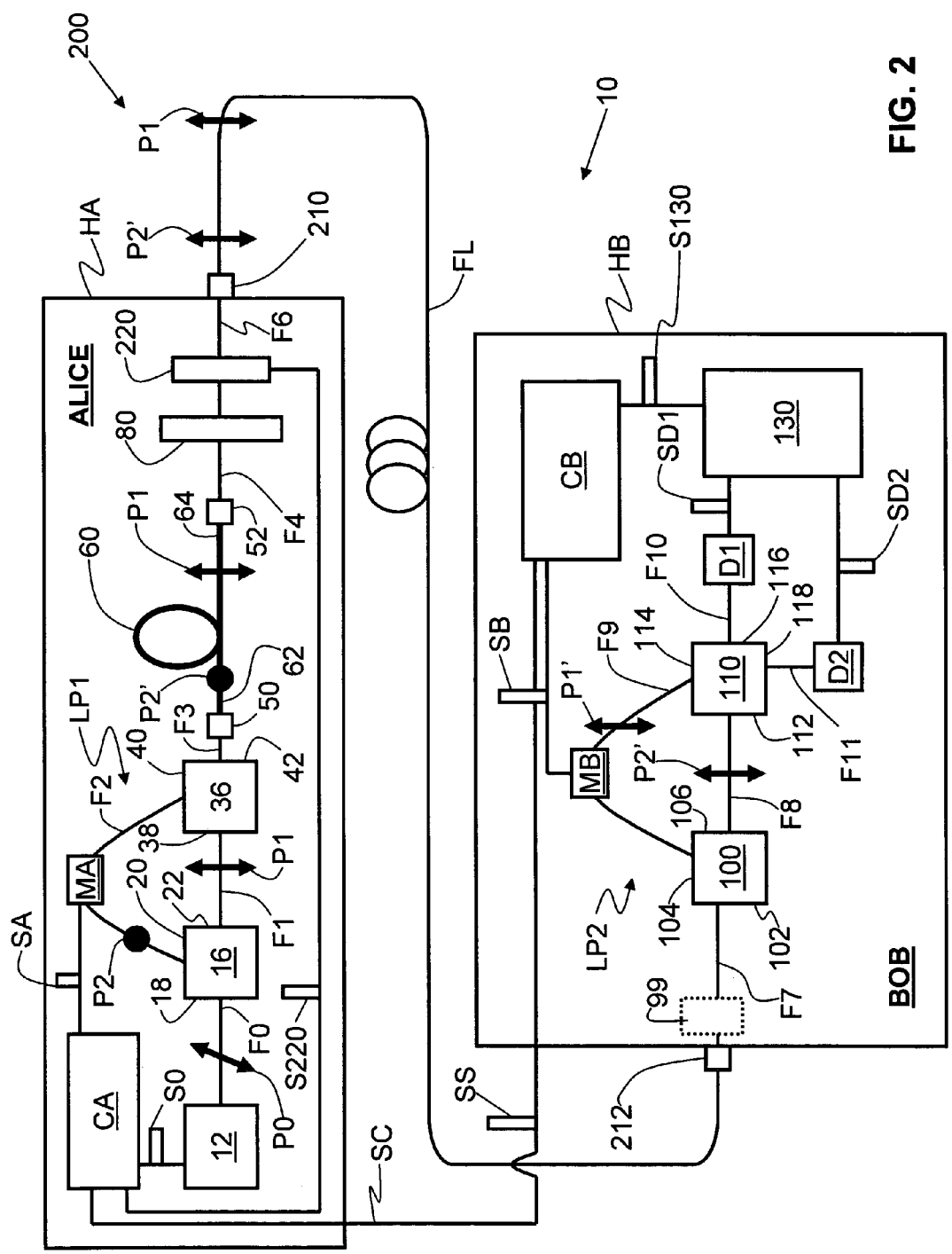
FIG. 2 is a schematic diagram of an example embodiment of a QKD system based on the optical fiber interferometer of FIG. 1.

An example application for the optical fiber interferometer of the present invention is for a QKD system. FIG. 2 is a schematic diagram of a QKD system 200 based on optical fiber interferometer 10 discussed above in connection with FIG. 1. QKD system 200 includes all of the above-mentioned elements of optical fiber interferometer 10, as well as additional elements that make up the QKD system, as described below.

QKD system 200 includes two QKD stations Alice and Bob. Alice includes light source 12, first loop LP1, first optical fiber coupler 50, PM optical fiber section 60, second optical fiber coupler 52, and polarization-adjusting member 80, all enclosed in a secure housing HA. Alice further includes a phase modulator MA arranged in optical fiber section F2, and a controller CA operably coupled to light source 12 and to the phase modulator. Alice also includes an optical fiber section F6 that couples polarization-adjusting member 80 to optical fiber link FL via an output port 210 of housing HA. Alice further includes a variable optical attenuator 220 arranged in optical fiber section F6 and operably coupled to controller CA.

Bob includes second interferometer loop LP2, along with photodetectors D1 and D2 and detector electronic unit 130 all enclosed in a secure housing HB. For QKD applications, photodetectors D1 and D2 are single-photon detectors (SPDs). Bob also includes a phase modulator MB in optical fiber section F9, and a controller CB operably coupled to detector electronic unit 130 and to the phase modulator. Controllers CB and CA are operably coupled via a synchronization channel SC that carries synchronization signals SS used to coordinate the operation of Bob and Alice and thus the operation of the QKD system as a whole. In an example embodiment, synchronization channel SC is carried over optical fiber link FL. Optical fiber link FL is optically coupled to loop LP2 via an optical fiber section F7 optically coupled to an input port 212 in housing HB.

In the operation of QKD system 200, controller CA generates a control signal SO that causes light source 12 to emit optical signal P0, which is divided into optical signals P1 and P2 as described above. However, optical pulse P2 now passes through modulator MA, which is activated via a timed activation signal SA from controller CA to impart a phase modulation randomly selected from a set of basis phase modulations, thus forming a once-modulated optical signal P2'. This modulation process is referred to herein as "selective random phase modulation." The signals P1 and P2' are then attenuated by a variable optical attenuator 220, which is set by controller CA via a control signal S220 to ensure that the optical signals leaving Alice are weak (quantum) optical signals.

Optical signals P1 and P2 then travel over to Bob as described above. However, at Bob optical pulse P1 passes through modulator MB, which is activated via a timed activation signal SB from controller CB to selectively randomly phase modulate optical signal P1 to form a once-modulated optical signal P1'.

Modulated optical signals P1' and P2' are then interfered at beam splitting prism 110 and the interfered signal detected at either SPD D1 or SPD D2, depending on the overall phase imparted to optical signals P1' and P2'. For each pair of interfered optical signals P1' and P2', one electrical detector signal SD1 or SD2 is generated and sent to detector electronic unit 130, which provides the information provided to controller CB.

Once a sufficient number of optical signals are exchanged between Alice and Bob, the usual QKD processing (i.e., error correction, sifting, privacy amplification, etc.) is applied to the data via communication between controllers CA and CB.

The advantage of using optical fiber interferometer 10 in QKD system 200 is that the resulting QKD system is far easier and much less expensive to manufacture than prior art optical-fiber-based QKD systems. In an example embodiment, the qubit error rate (QBER) is used to assess the OPL difference between optical fiber loops LP1 and LP2. If the difference adversely affects the QBER, then the length $L_{60}$ of PM optical fiber section 60 is adjusted (rather than the individual optical fiber loops) so that the QBER is optimized (e.g., minimized).

While the present invention is described above in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An optical fiber interferometer, comprising:
   first and second optical fiber loops having an optical path length (OPL) difference between them; and
   a polarization-maintaining (PM) optical fiber section having fast and slow optical axes and a length ($L_{60}$), wherein the PM optical fiber section optically couples the first and second optical fiber loops and is arranged to carry first and second orthogonally polarized optical signals from the first optical fiber loop along fast and slow optical axes, respectively, wherein the length $L_{60}$ is made to impart a time delay between the first and second orthogonally polarized optical signals so as to compensate for said optical path length difference.

2. The optical fiber interferometer of claim 1, including at or near an output end of the PM optical fiber section a polarization-adjusting member adapted to convert the first and second orthogonally polarized optical signals transmitted by the PM optical fiber section to first and second co-polarized optical signals that travel through the second optical fiber loop.

3. The optical fiber interferometer of claim 1, further including an optical fiber link optically coupled to the PM optical fiber section and to either the first or second optical fiber loop.

4. The optical fiber interferometer of claim 1, wherein the first and second optical fiber loops each include two beam splitting elements and two optical fiber sections optically coupled thereto.

5. The optical fiber interferometer of claim 1, further including:
   first and second photodetectors arranged optically downstream of the second optical fiber loop and arranged to detect interfered optical signals formed by said second optical fiber loop and generate electrical detector signals in response thereto; and
   a detector electronic unit electrically coupled to the first and second photodetectors and adapted to receive and process said electrical detector signals.

6. A quantum key distribution system, comprising:

the optical fiber interferometer of claim 1;

first and second phase modulators respectively arranged in the first and second optical fiber loops and adapted to selectively randomly phase modulate respective said first and second optical signals passing therethrough; and first and second single-photon detectors (SPDs) respectively arranged relative to the second optical fiber loop to detect in one of the first and second SPDs an interfered optical signal formed by the second optical fiber loop from the first and second modulated optical signals.

7. An optical fiber interferometer comprising:

a first optical fiber loop adapted to carry orthogonally polarized first and second optical signals in respective first and second arms of the first loop;

a polarization-maintaining (PM) optical fiber section optically coupled at an input end to the first optical fiber loop and adapted to transmit the orthogonally polarized first and second optical pulses along respective fast and slow axes;

a polarization-adjusting member arranged at or near an output end of the PM optical fiber section and adapted to receive the orthogonally polarized first and second optical signals transmitted by the PM optical fiber section and form co-polarized first and second optical signals;

a second optical fiber loop optically coupled to the polarization-adjusting member and adapted to interfere the first and second co-polarized optical pulses, wherein the first and second optical fiber loops have an optical path length (OPL) difference between them; and wherein the PM optical fiber section has a length and orientation selected to compensate for the OPL difference.

8. The optical fiber interferometer of claim 7, further including an optical fiber link optically coupled to the PM optical fiber section and to either the first or second optical fiber loop.

9. A method of forming an optical fiber interferometer, comprising:

providing first and second optical fiber loops having an optical path length (OPL) difference between them; and optically coupling the first and second optical fiber loops with a polarization-maintaining (PM) optical fiber section having a length and orientation of fast and slow optical axes selected to impart a time-delay to orthogonally polarized optical signals traveling therethrough so as to compensate for said optical path difference.

10. The method of claim 9, including:

measuring the optical path length difference; and forming the length of the PM optical fiber section based on said measured optical path length difference;.

11. The method of claim 9, including optically coupling either the first or second loop to the PM optical fiber section with an optical fiber link.

12. A method of forming a quantum key distribution system, comprising:

forming an optical fiber interferometer according to the method of claim 9; and providing respective first and second phase modulators to the first and second optical fiber loops, wherein the first and second phase modulators are each adapted to impart a selectively random phase modulation to respective first and second optical signals passing therethrough.

* * * * *